(12) United States Patent
McKelvey et al.

(10) Patent No.: US 6,978,597 B2
(45) Date of Patent: Dec. 27, 2005

(54) FLAME DETECTING APPARATUS FOR GAS TURBINE

(75) Inventors: Terence McKelvey, Chiba (JP); Eishi Marui, Kanagawa (JP); Masahiro Miyamoto, Kanagawa (JP); Tadashi Kataoka, Chiba (JP); Tai Furuya, Kanagawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 10/482,406

(22) PCT Filed: Mar. 20, 2003

(86) PCT No.: PCT/JP03/03427

§ 371 (c)(1),
(2), (4) Date: Jun. 1, 2004

(87) PCT Pub. No.: WO03/078813

PCT Pub. Date: Sep. 25, 2003

(65) Prior Publication Data

US 2004/0200206 A1 Oct. 14, 2004

(30) Foreign Application Priority Data

Mar. 20, 2002 (JP) ............................. 2002-078887
Mar. 22, 2002 (JP) ............................. 2002-080972
Mar. 22, 2002 (JP) ............................. 2002-080973

(51) Int. Cl.[7] ............................. F02C 9/00; F02G 3/00
(52) U.S. Cl. ............................. 60/39.281; 60/39.27
(58) Field of Search .................. 60/39.27, 39.281, 60/794

(56) References Cited

U.S. PATENT DOCUMENTS

| | | | | |
|---|---|---|---|---|
| 4,732,130 A | * | 3/1988 | Suzuki ........................ 123/480 |
| 5,163,316 A | * | 11/1992 | Toyoda et al. ............. 73/117.3 |
| 5,239,966 A | * | 8/1993 | Yamagata et al. .......... 123/493 |
| 5,533,329 A | * | 7/1996 | Ohyama et al. ............... 60/773 |
| 5,687,692 A | * | 11/1997 | Togai et al. ................. 123/436 |
| 5,694,760 A | * | 12/1997 | Baxter ......................... 60/773 |
| 6,026,644 A | * | 2/2000 | Ito et al. ...................... 60/737 |
| 6,247,300 B1 | | 6/2001 | Muramatsu et al. | |
| 6,289,877 B1 | * | 9/2001 | Weisbrod et al. ........... 123/480 |
| 6,438,937 B1 | * | 8/2002 | Pont et al. .................... 60/776 |
| 6,442,943 B1 | | 9/2002 | Harrison et al. | |

(Continued)

FOREIGN PATENT DOCUMENTS

EP 0 509 953 A1 10/1992

(Continued)

Primary Examiner—William H. Rodriguez
(74) Attorney, Agent, or Firm—Oblon, Spivak, McClelland, Maier & Neustadt, P.C.

(57) ABSTRACT

A gas turbine apparatus is provided wherein a turbine is driven or rotated by burning a mixture of a fuel and compressed air and supplying a combustion gas generated by the combustion. A flameout determination unit is provided in the apparatus which is adapted to calculate the air/fuel ratio in the air/fuel mixture, correct the calculated air/fuel ratio to calculate a corrected air/fuel ratio which is substantially constant, compare the calculated corrected air/fuel ratio with a predetermined reference air/fuel ratio, and generate a signal indicative of occurrence of a flameout when the corrected air/fuel ratio is smaller than the reference air/fuel ratio. The corrected air/fuel ratio is calculated by calculating a deviation of a compressor discharge pressure of the compressed air from an air compressor, from a predetermined reference pressure, multiplying the pressure deviation by a predetermined constant, and adding the pressure deviation multiplied by the predetermined constant to the calculated air/fuel ratio. In this way, the corrected air/fuel ratio can be maintained substantially constant even if a load increases in steps.

7 Claims, 9 Drawing Sheets

U.S. PATENT DOCUMENTS

| | | | |
|---|---|---|---|
| 6,598,589 B2 * | 7/2003 | Frelund et al. | 123/435 |
| 6,609,379 B2 * | 8/2003 | Nagata et al. | 60/773 |
| 6,644,017 B2 * | 11/2003 | Takahashi et al. | 60/285 |
| 2002/0011063 A1 * | 1/2002 | Nagata et al. | 60/39.03 |
| 2004/0011050 A1 * | 1/2004 | Inoue | 60/773 |
| 2004/0055272 A1 * | 3/2004 | Tanaka | 60/39.182 |
| 2004/0112038 A1 * | 6/2004 | Tanaka et al. | 60/39.27 |
| 2004/0211165 A1 * | 10/2004 | Hosokawa et al. | 60/39.23 |

FOREIGN PATENT DOCUMENTS

| | | | |
|---|---|---|---|
| JP | 59-018241 | 1/1984 | |
| JP | 11-264327 | 9/1999 | |
| JP | 2000-291485 | * 10/2000 | F02D 45/00 |
| JP | 2001-033038 | 2/2001 | |
| WO | 96/00364 | 1/1996 | |

* cited by examiner

FLAME DETECTING APPARATUS FOR GAS TURBINE

TECHNICAL FIELD OF THE INVENTION

The present invention relates to a gas turbine apparatus, and more particularly, to a gas turbine apparatus which is capable of rapidly determining occurrence of a flameout upon starting of the apparatus or during a load operation thereof.

PRIOR ART

A typical gas turbine apparatus for generating electric power basically comprises a turbine rotatably mounted on a rotating shaft; a combustor for generating a combustion gas; a fuel control valve for adjusting the amount of fuel to the combustor; and an air compressor for sending compressed air to the combustor; and a generator. The generator is connected to the turbine through the rotating shaft, so that the turbine, air compressor and generator are generally configured to be integrally driven through the rotating shaft.

In such a configuration as described above, a fuel adjusted by the fuel control valve and air compressed by the air compressor (hereinafter called the "compressed air") are supplied to the combustor in which a mixture of the compressed air and fuel is formed. Then, the air/fuel mixture is burnt in the combustor to generate a combustion gas which is supplied to the turbine, causing the turbine to revolve at high speeds. As mentioned above, the generator is mounted at one end of the rotating shaft, so that the generator is driven by the turbine through the rotating shaft for generating electric power.

Such a gas turbine apparatus as described above generally comprises a controller for controlling the turbine which is supplied with the combustion gas for rotation. The turbine controller conducts a feedback control for controlling a rotational speed (or the number of rotation per unit time) of the turbine and an acceleration thereof. Specifically, a current speed of the turbine and a current acceleration thereof are fed back to a processor which calculates the amount of supplied fuel which minimizes a deviation of the fed-back value from a preset target value. Then, the opening degree of the fuel control valve is operated to provide the calculated amount of fuel supplied to the combustor, thereby increasing or decreasing the amount of combustion gas supplied to the turbine to control the number of rotations of the turbine.

Such a foregoing gas turbine apparatus may suffer from so-called flameout, i.e., sudden extinction of combustion flame while the combustor is still being supplied with the fuel. This flameout would not only stop the operation of the gas turbine apparatus but fill the gas turbine apparatus with the supplied fuel or air/fuel mixture which could ignite and explode by residual heat in the turbine or the like, thus creating an extremely dangerous situation. Therefore, it is critical to be able to immediately sense a flame-out, if it occurs, to stop the supply of the fuel.

Possible factors that must be taken into consideration for determining the occurrence of a flameout may include a mass flow ratio (or weight flow ratio) of air to fuel in an air/fuel mixture, i.e., an air/fuel ratio (A/F). The air/fuel ratio indicates the mass flow ratio of air to fuel, served for combustion, i.e., a mixture ratio, and can be calculated by dividing a flow rate of the air per unit time by a flow rate of the fuel per unit time. As described above, the air is compressed by the air compressor before it is provided to the combustor, and the air compressor is driven by the turbine, so that the flow rate of the air is proportional to the number of rotations of the turbine. The flow rate of the fuel is proportional to the opening degree of the fuel control valve. Therefore, the air/fuel ratio can be derived from the number of rotations of the turbine and the opening degree of the fuel control valve.

Since occurrence of a flameout causes a shut down of the supply of combustion gas, the number of rotations of the turbine (the flow rate of the air) is suddenly reduced. In response thereto, the opening degree of the fuel control valve (and thus the flow rate of the fuel) is increased by the feedback control for recovering the reduced number of rotations, resulting in a lower air/fuel ratio. Therefore, when an air/fuel ratio which is assumed when the flameout occurs, is previously set as a reference air/fuel ratio for determining that the flameout has occurred, it is possible to make such a determination when the actual air/fuel ratio falls below the reference air/fuel ratio. Based on this strategy, a conventional gas turbine apparatus employs a method which involves monitoring a process value of the air/fuel ratio at all times, and determines that a flameout has occurred when it senses that the process value falls below the set reference air/fuel ratio.

As mentioned above, the gas turbine apparatus comprises the controller for controlling the turbine, and conducts a control to maintain a constant rotational speed with reference to a rotational speed of the turbine in a normal load operation particularly in order to stably output the electric power from the generator. Thus, in the gas turbine apparatus which controls the turbine to maintain a constant rotational speed, as the turbine is applied with a load, the amount of supplied fuel is increased to recover the rotational speed which has once been decreased due to an increase in the load. In other words, the air/fuel ratio becomes smaller in accordance with the magnitude of the load, because an increased amount of fuel is supplied while the turbine continues to rotate at the constant rotational speed.

For example, when the magnitude of the load increases in steps, the value of the air/fuel ratio becomes smaller in accordance with the magnitude of the load. FIG. 1 shows how respective numerical values change in a gas turbine apparatus during such a condition as above. As shown in FIG. 1, an opening degree FCV of the fuel control valve is increased in response to a load LOAD which increases in steps, in order to maintain a rotational speed (or the number of rotations) NR of the turbine constant, with an associated reduction in an air/fuel ratio A/F. In this event, when a reference air/fuel ratio is set, for example, at a value indicated by A/F(ref1) in FIG. 1, the reduced air/fuel ratio A/F may fall below the reference air/fuel ratio (at time t1), resulting in misidentification of a flameout even though no flameout has actually occurred.

To avoid such misidentification, conventionally, the reference air/fuel ratio is set at a value lower than a minimum value of the air/fuel ratio, indicated by A/F(ref2) in FIG. 1, which is reduced in response to an increased load to attain a solution.

However, as mentioned above, the reference air/fuel ratio having a low value (A/F(ref2)) results in a large difference between the air/fuel ratio during a non-load operation (or at rated rotation) and the reference air/fuel ratio, so that it takes a long time before the reduced air/fuel ratio reaches the reference air/fuel ratio. Consequently, there is a large time lag from the occurrence of actual flameout to determination of the occurrence of the flameout. This means a delay in the timing at which the supplied fuel should be shut down, possibly giving rise to an accident as mentioned above.

It should be noted that even if a load increases substantially in a linear fashion rather than in steps, there is a possibility that the conventional determining method makes misidentification of flameout occurrence. When the reference air/fuel ratio is set at a lower value in order to prevent such misidentification, the aforementioned accident may arise when the flameout actually occurs.

In addition, since the air/fuel ratio A/F fluctuates depending on operating conditions in different phases even during a normal operation, the air/fuel ratio may fall below a set reference air/fuel ratio. Such a situation also leads to misidentification of flameout occurrence. To avoid this misidentification, it is necessary to set the reference air/fuel ratio, which should be relied on to determine the occurrence of a flameout, to a value lower than the air/fuel ratio which is expected to be reduced during a normal operation. Particularly, during a normal operation, the air/fuel ratio indicates the lowest value upon starting the gas turbine apparatus.

FIG. 2 is a graph showing how a rotational speed NR of a turbine and an air/fuel ratio A/F fluctuate upon start of a conventional gas turbine apparatus. In FIG. 2, A/F1 indicates the air/fuel ratio during a normal operation, and A/F(ref) indicates a reference air/fuel ratio. Generally, when the gas turbine apparatus is started up, an air/fuel mixture is ignited while the rotation of the turbine is maintained by a starting motor at a rotational speed at which ignition can be made (from time t1 to time t2 in FIG. 2).

As shown in FIG. 2, after time t2 at which the air/fuel mixture is ignited, the rotational speed of the turbine accelerates with a gradually-increasing amount of fuel supplied thereto. In other words, the air/fuel ratio A/F is increased substantially in proportion to the increasing rotational speed NR of the turbine. Thus, the air/fuel ratio A/F presents the lowest value immediately after the ignition (at time t2), as shown in FIG. 2. For this reason, conventionally, the reference air/fuel ratio A/F(ref), which should be relied on to determine occurrence of a flameout, must be set at a value lower than the air/fuel ratio at a time immediately after the ignition, as shown in FIG. 2.

However, the reference air/fuel ratio A/F(ref) set at a low value results in an extremely large difference between the air/fuel ratio A/F (=A/F1) and the reference air/fuel ratio A/F(ref) during a normal operation. Consequently, when a flameout actually occurs, a longer time is required for the reduced air/fuel ratio to reach the reference air/fuel ratio, causing a delay of the timing at which the supplied fuel should be stopped, possibly leading to an accident.

DISCLOSURE OF THE INVENTION

The present invention has been made in view of the problems as mentioned above, and it is an object of the invention to provide a gas turbine apparatus which is capable of reliably and rapidly detecting occurrence of a flameout.

In order to attain the object as above, the present invention provides a gas turbine apparatus for burning a mixture of a fuel and compressed air, and supplying a turbine with a combustion gas generated by the combustion to drive the turbine, wherein the gas turbine apparatus includes a flameout determination unit comprising:

means for calculating an air/fuel ratio in the air/fuel mixture;

means for correcting the calculated air/fuel ratio to calculate a corrected air/fuel ratio which is substantially constant; and determination means for comparing the calculated corrected air/fuel ratio with a predetermined reference air/fuel ratio to generate a signal indicative of occurrence of a flameout when the corrected air/fuel ratio is smaller than the reference air/fuel ratio.

A first embodiment of the corrected air/fuel ratio calculation means of the gas turbine apparatus according to the present invention comprises: means for calculating a pressure deviation of a compressor discharge pressure of the compressed air from an air compressor detected by pressure detection means from a predetermined reference pressure, and multiplying the pressure deviation by a predetermined constant; and means for adding the value obtained by multiplying the pressure deviation and the predetermined constant to the air/fuel ratio calculated by the air/fuel ratio calculation means to calculate a corrected air/fuel ratio which remains substantially constant even when the gas turbine apparatus is applied with an increasing load.

A second embodiment of the corrected air/fuel ratio calculation means of the gas turbine apparatus according to the present invention comprises: means for calculating a rotation deviation of a rotational speed of the turbine detected by rotational speed detection means from a predetermined reference rotational speed, and multiplying the rotational speed deviation by a predetermined constant; and means for adding the value obtained by multiplying the rotational speed deviation and the predetermined constant to the air/fuel ratio calculated by the air/fuel ratio calculation means to calculate a corrected air/fuel ratio which remains substantially constant during a starting-up condition of the gas turbine apparatus is started.

A third embodiment of the corrected air/fuel ratio calculation means of the gas turbine apparatus according to the present invention includes both of the first and second embodiments of the corrected air/fuel ratio calculation means. In this case, the determination means comprises a first determination means for comparing the first corrected air/fuel ratio with a first predetermined reference air/fuel ratio to generate a signal indicative of occurrence of a flameout when the first corrected air/fuel ratio is smaller than the first reference air/fuel ratio; and a second determination means for comparing the second corrected air/fuel ratio with a second predetermined reference air/fuel ratio to generate a signal indicative of occurrence of a flameout when the second corrected air/fuel ratio is smaller than the second reference air/fuel ratio.

The present invention is also provided a gas turbine apparatus for burning a mixture of a fuel and air compressed by an air compressor, and supplying a turbine with a combustion gas generated by the combustion to drive the turbine, wherein the gas turbine apparatus includes a flameout determination unit comprising:

means for calculating an air/fuel ratio in the air/fuel mixture;

means for calculating an acceleration of a rotational speed of the turbine detected by rotational speed detection means;

means for calculating a variation of an exhaust gas temperature of the turbine detected by temperature detection means; and determination means for determining whether the calculated air/fuel ratio is smaller than a predetermined reference air/fuel ratio, determining whether the calculated acceleration of the rotational speed of the turbine is negative, and determining whether the calculated variation of the exhaust gas temperature is negative, to generate a signal indicative of occurrence of a flameout when the results of the determinations are all affirmative.

BEST MODE FOR CARRYING OUT THE INVENTION

Figure 3A:
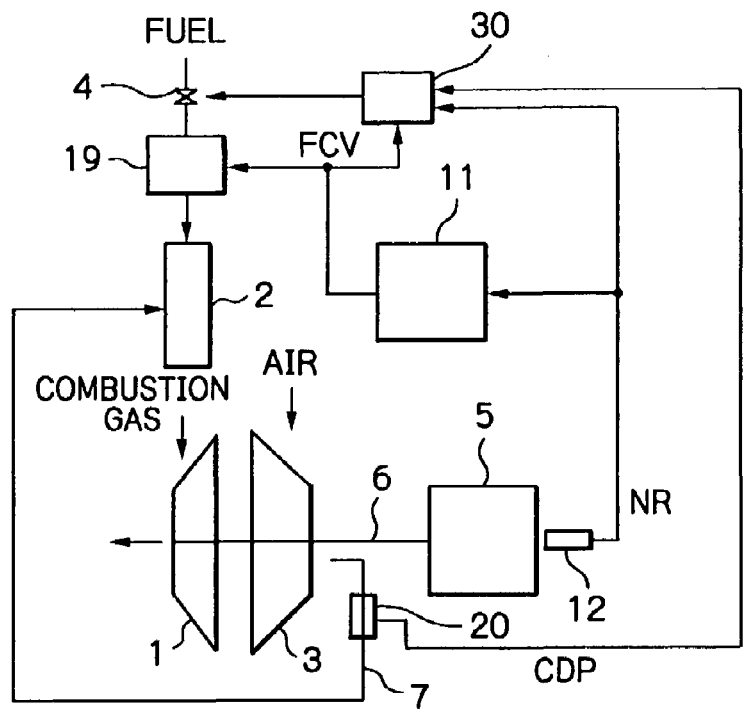
FIG. 3A is a block diagram illustrating a first embodiment of a gas turbine apparatus according to the present invention.

FIG. 3A is a schematic diagram generally illustrating a configuration of a gas turbine apparatus according to one embodiment of the present invention. As illustrated in FIG. 3A, the gas turbine apparatus 100 comprises a turbine 1; a combustor 2 for burning an air/fuel mixture to generate a combustion gas; a fuel control valve 19 for adjusting the amount of fuel supplied to the combustor 2; and an air compressor 3 for providing compressed air to the combustor 2. The gas turbine apparatus also comprises a turbine controller 11 for controlling the turbine 1; and a pressure sensor 20 for detecting a pressure CDP of discharged air compressed by the air compressor 3.

The turbine 1, which has a plurality of rotor blades for rotation in response to a movement of fluid, is rotatably supported within a casing (not shown) through a rotation shaft 6. The air compressor 3 is configured to be driven by the turbine 1 through the rotation shaft 6 to compress air. The air compressor 3 is connected to the combustor 2 through a pipe 7, so that air compressed by the air compressor 3 is supplied to the combustor 2 through the pipe 7.

The fuel control valve 19 is disposed upstream of the combustor 2. A fuel supplied from a fuel supply source (not shown) is supplied to the combustor 2 after it passes through the fuel control valve 19. The fuel control valve 19 has a variable opening, so that the amount of fuel supplied to the combustor 2 is adjusted by controlling the opening degree.

The fuel and compressed air supplied to the combustor 2 form an air/fuel mixture in the combustor 2, and the air/fuel mixture is burnt therein to generate a high-temperature and high-pressure combustion gas. Then, the generated combustion gas is supplied to the turbine 1, thereby permitting turbine 1 to rotate at a high speed.

A rotational speed sensor 12 is disposed near an end of the rotating shaft 6 for detecting the number of rotations NR of the turbine 1. The detected number of rotations NR is communicated to the turbine controller 11 which conducts a feedback control for controlling the turbine. A generator 5 is connected to one end of the rotating shaft 6, such that the generator 5 is driven or rotated by the turbine 1 through the rotating shaft 6 for generating electric power.

Figure 3B:
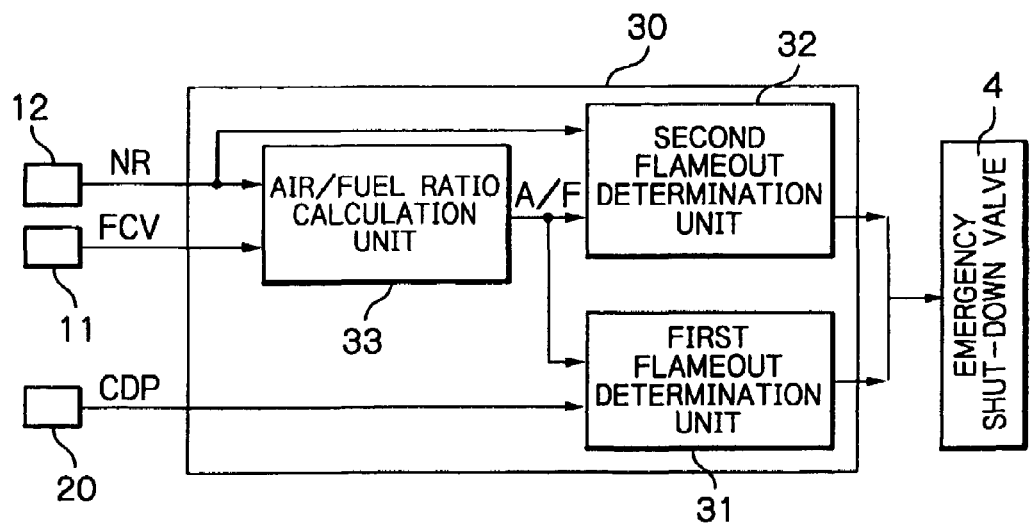
FIG. 3B is a block diagram illustrating a configuration of a flameout determination section provided in the gas turbine apparatus shown in FIG. 3A.

The gas turbine apparatus 100 further comprises an emergency shut-down valve 4 located between the fuel control valve 19 and a fuel source (not shown), and a flameout determination section 30 for outputting a signal for closing the emergency shut-down valve 4. As illustrated in FIG. 3B, the flameout determination section 30 is composed of a first flameout determination unit 31 for determining occurrence of a flameout during a normal operation of the gas turbine apparatus 100; a second flameout determination unit 32 for determining occurrence of a flameout upon starting-up the gas turbine apparatus 100; and an air/fuel ratio calculation unit 33. The flameout determination section 30 is ccommunicated with a signal NR indicative of a rotational speed (or the number of rotations per unit time) of the turbine, a signal CDP indicative of a compressor discharge pressure from the pressure sensor 20, and a signal FCV indicative of the opening degree of the fuel control valve 19 from the turbine controller 11.

The air/fuel ratio calculation unit 33 calculates the air/fuel ratio A/F based on the rotational speed NR and the opening degree FCV of the fuel control valve 19. As mentioned above, air supplied to the combustor 2 is compressed by the air compressor 3 before it is supplied, and the air compressor 3 is driven by the turbine 1, so that the flow of the air in an air/fuel mixture is proportional to the rotational speed NR of the turbine 1. The amount of fuel supplied to the combustor 2, in turn, is proportional to the opening degree FCV of the fuel control valve 19. Thus, the air/fuel ratio calculation unit 33 can calculate the air/fuel ratio A/F based on the rotational speed NR of the turbine 1 detected by the rotational speed sensor 12, and the opening degree FCV of the fuel control valve 19 communicated from the turbine control unit 11.

Figure 4:
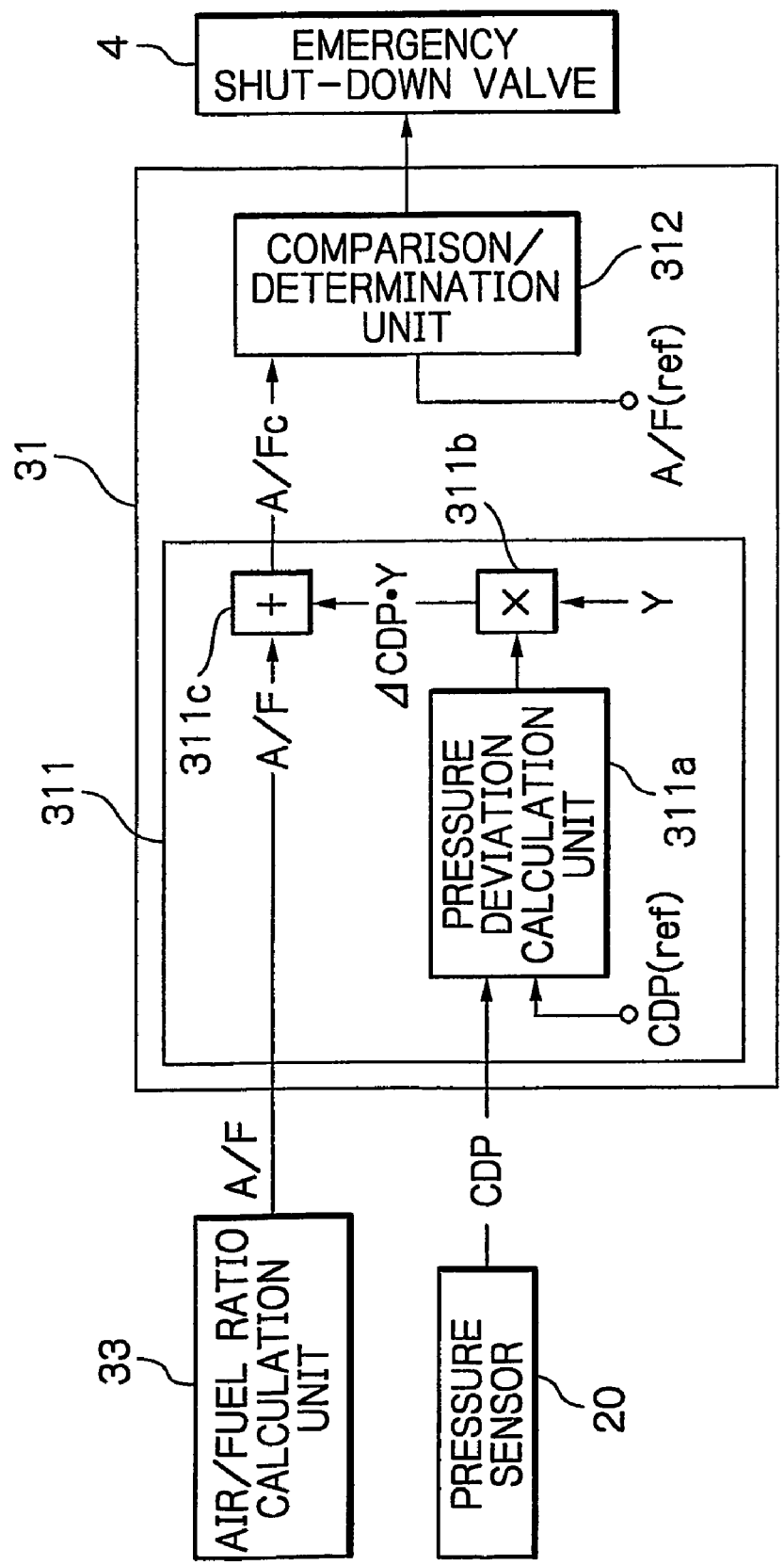
FIG. 4 is a block diagram illustrating an embodiment of a first flameout determination unit in the flameout determination section illustrated in FIG. 3B.
Figure 5:
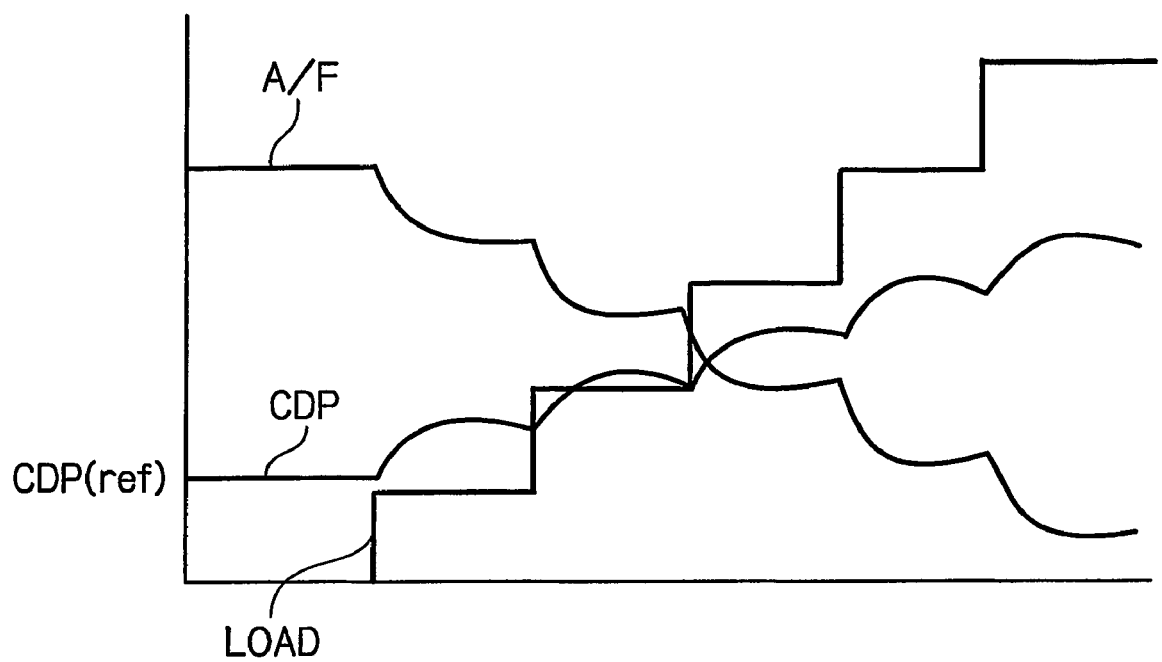
FIGS. 5 and 6 are graphs for explaining how the first flameout determination unit illustrated in FIG. 4 can avoid erroneous detection for flameout even if a load increases in steps and can promptly detect a flameout when it actually occurs.

FIG. 4 illustrates a configuration of the first flameout determination unit 31, i.e., for determining a flameout when the turbine controller 11 is controlling the turbine 1 to maintain the rotational speed of the turbine 1 at a rated rotational speed during a load operation. As illustrated in FIG. 4, the first flameout determination unit 31 is composed of a corrected air/fuel ratio calculation unit 311, and a comparison/determination unit 312. The corrected air/fuel ratio calculation unit 311 adds a predetermined correction value depending on the discharge pressure CDP of the air compressor 3 to the air/fuel ratio A/F calculated by the air/fuel ratio calculation unit 33 to calculate a corrected air/fuel ratio A/Fc which remains substantially constant. For this purpose, the corrected air/fuel ratio calculation unit 311 calculates a deviation of the discharge output CDP of the air compressor 3 detected by the pressure sensor 20 from a predetermined reference pressure CDP(ref) in a pressure deviation calculation unit 311a. The reference pressure CDP(ref) is preferably set to the value of the normal compressor discharge pressure CDP during an operation at the rated rotational speed, for example, as shown in FIG. 5. Then, a multiplier 311b multiplies the deviation by a predetermined constant Y to calculate a correction value $\Delta CDP \cdot Y$, and an adder 311c adds the correction value $\Delta CDP \cdot Y$ and the air/fuel ratio A/F calculated by the air/fuel ratio calculation unit 33 to derive a corrected air/fuel ratio A/Fc:

$$A/Fc = \Delta CDP \cdot Y + A/F$$

The constant Y is such a value that makes the corrected air/fuel ratio A/Fc substantially constant, as will be later described.

As illustrated in FIG. 4, the corrected air/fuel ratio A/Fc calculated in the corrected air/fuel ratio calculation unit 311 is next sent to the comparison/determination unit 312. The comparison/determination unit 312 compares the corrected air/fuel ratio A/Fc received from the corrected air/fuel ratio calculation unit 311 with a previously set reference air/fuel ratio A/F(ref), and outputs a signal indicating that a flameout occurs when the former is lower than the latter. Then, the emergency shut-down valve 4 disposed upstream of the combustor 2 is closed in response to this signal to immediately shut down the supply of fuel to the combustor 2.

Figure 1:
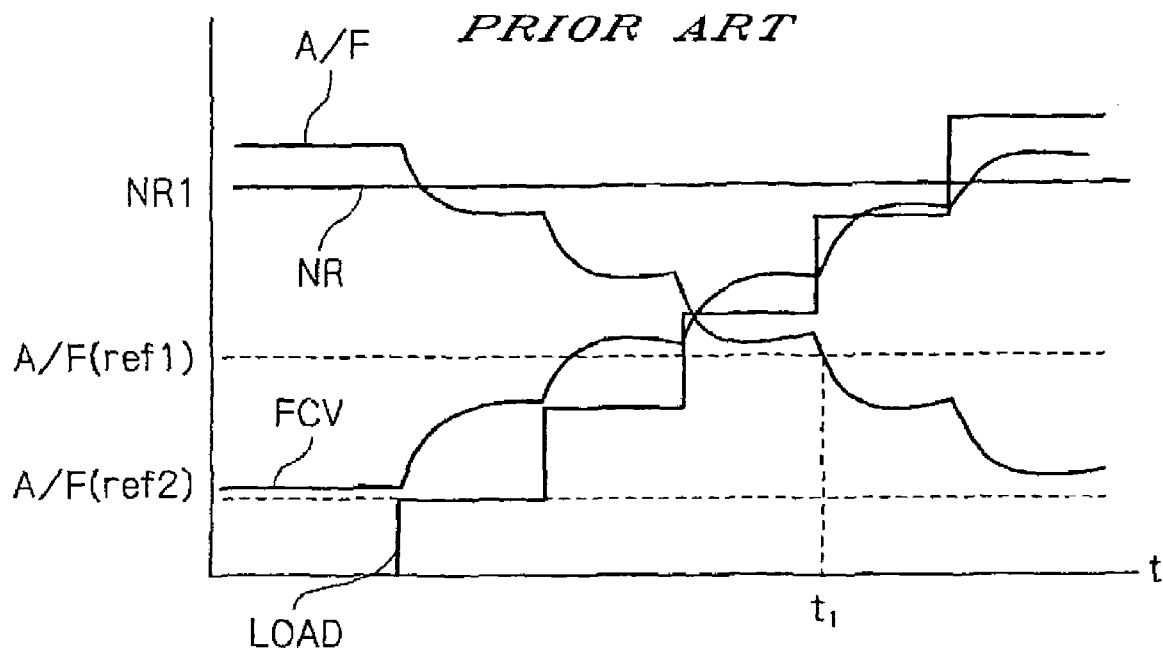
FIG. 1 is a graph for explaining how an increasing load leads to misidentification of a flameout, even though it has not occurred, in a conventional flameout detecting method in a gas turbine apparatus.
Figure 2:
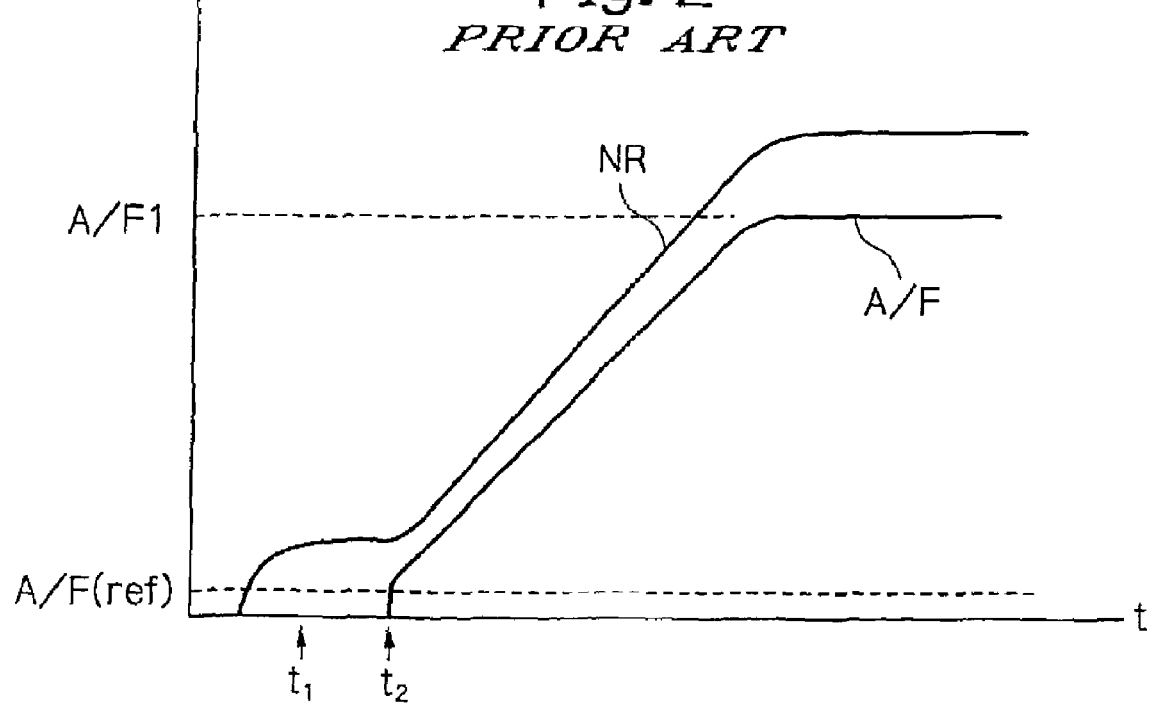
FIG. 2 is a graph for explaining how a flameout is misidentified, even though it has not occurred, upon starting the gas turbine apparatus, in the conventional flameout detecting method in the apparatus.
Figure 6:
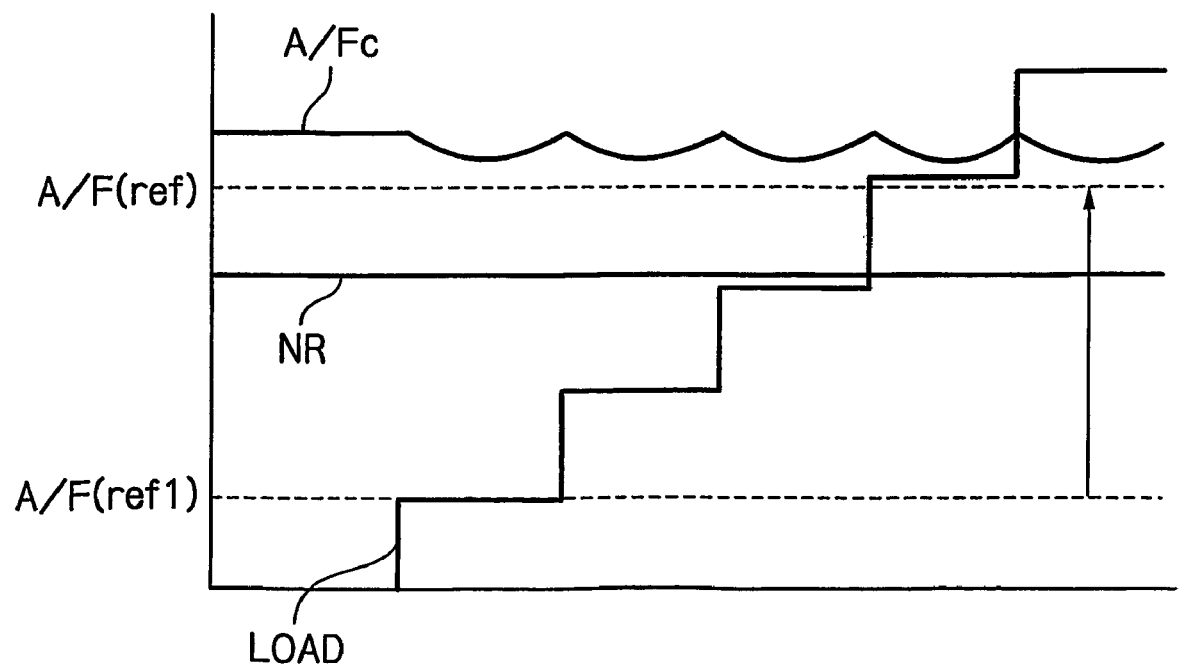

The reason that the corrected air/fuel ratio A/Fc calculated as described above remains substantially at a constant value, will be explained with reference to FIGS. 5 and 6. In the gas turbine apparatus which controls the turbine 1 to make the rotational speed NR constant, when a load LOAD applied to the turbine 1 is increased in steps, the amount of supplied fuel (proportional to FCV) is increased by a feedback control for recovering the rotational speed NR of the turbine 1 which tends to decrease (see FIG. 1).

In response, the air/fuel ratio A/F is reduced in proportion to the magnitude of the load, as shown in FIG. 5. Also, since the amount of turbine work is simultaneously increased with the increase in the amount of supplied fuel, due to the increased volume flow rate of high temperature combustion gas, the discharge pressure CDP of the compressed air is also increased substantially in proportion to the magnitude of the load. In other words, the air/fuel ratio A/F behaves substantially in reciprocal proportion to the discharge pressure CDP of the compressed air, as shown in FIG. 5. It is, therefore, possible to find the correction value $\Delta CDP \cdot Y$ which compensates the reduction of the air/fuel ratio A/F by appropriately setting the predetermined constant Y shown in FIG. 4. Then, by adding the correction value $\Delta CDP \cdot Y$ to the actual or calculated air/fuel ratio A/F, the corrected air/fuel ratio A/Fc calculated by the corrected air/fuel ratio calculation unit 311 can be made substantially constant. For reference, Y is an empirically derived value obtained through a test using the actual apparatus, such that $\Delta CDP \cdot Y + A/F$ is made substantially constant.

Since the corrected air/fuel ratio A/Fc is reduced when a flameout actually occurs, this corrected air/fuel ratio can be used as a factor for determining the occurrence of the flameout. As shown in FIG. 6, the reference air/fuel ratio A/F(ref) is set at a value slightly smaller than the corrected air/fuel ratio A/Fc during a non-load operation, and occurrence of a flameout is determined when the corrected air/fuel ratio A/Fc falls below the reference air/fuel ratio A/F(ref).

With the employment of the determining method as described above, the corrected air/fuel ratio A/Fc remains substantially constant even when a load fluctuates during a nomal operation, so that no determination is made that a flameout occurs. Then, since the corrected air/fuel ratio A/Fc is reduced only when a flameout actually occurs, the occurrence of the flameout can be precisely determined. Moreover, the reference air/fuel ratio A/F(ref) can be set to a value closer to the corrected air/fuel ratio A/Fc during a non-load operation, as compared with the conventional set value A/F(ref1), as shown in FIG. 6. Therefore, as the corrected air/fuel ratio is reduced in response to a flameout, it reaches the reference air/fuel ratio A/F(ref) soon, and as a result, it is possible to extremely rapidly determine the flameout occurrence.

As described above, according to the first flameout determination unit 31 described above, in the gas turbine apparatus which controls the turbine such that the rotational speed remains constant, even when the gas turbine apparatus is subjected to an increasing load condition, the aforementioned correction value is added to the air/fuel ratio to derive the corrected air/fuel ratio which is a substantially constant value. Thus, this corrected air/fuel ratio is monitored, so that the reference air/fuel ratio, which is relied on to determine occurrence of a flameout, can be set to a value approximate to the corrected air/fuel ratio. As a result, since the corrected air/fuel ratio, which is reduced upon occurrence of an actual flameout, reaches the reference air/fuel ratio quickly, it is possible to extremely rapidly sense that the flameout has occurred.

Figure 7:
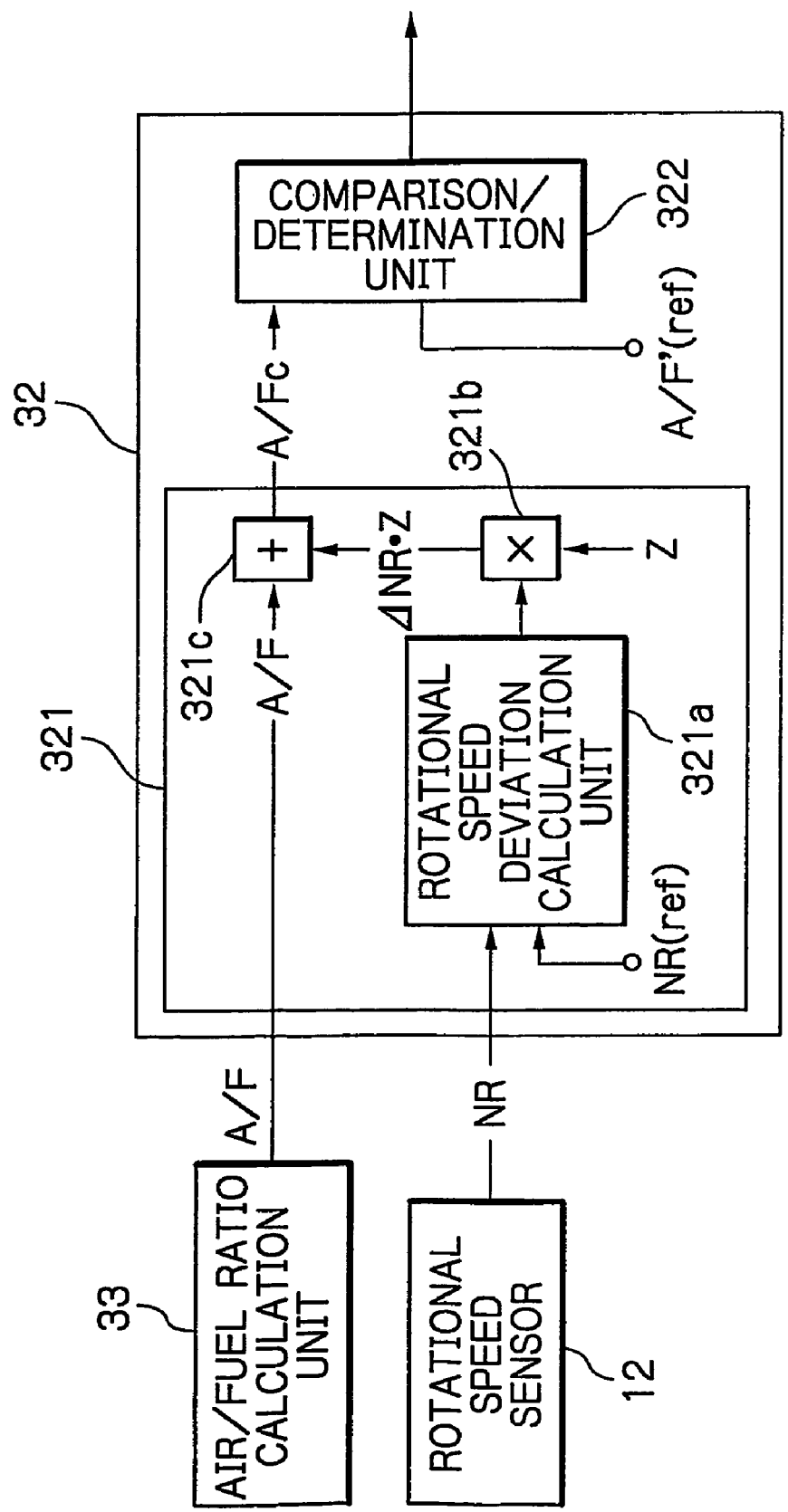
FIG. 7 is a block diagram illustrating an embodiment of a second flameout determination unit in the flameout determination section illustrated in FIG. 3B.
Figure 8:
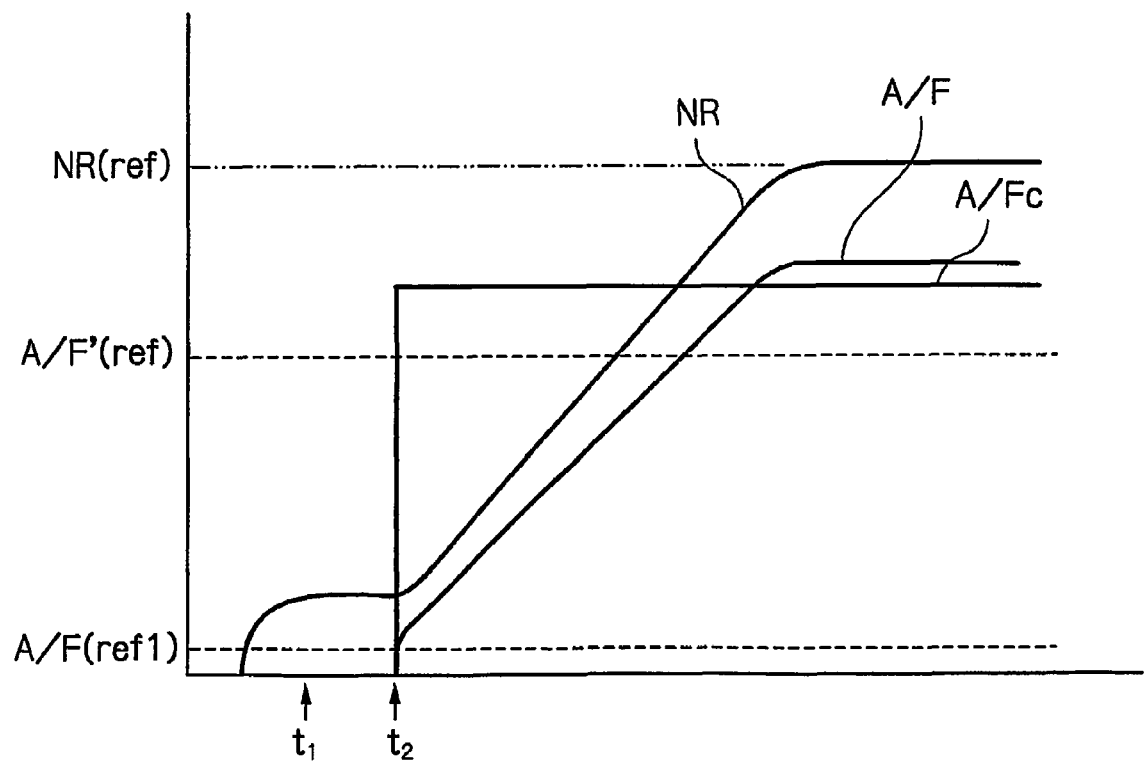
FIG. 8 is a graph for explaining how the second flameout determination unit illustrated in FIG. 7 can avoid erroneous detection for flameout upon starting and can promptly detect a flameout when it actually occurs.

FIG. 7 illustrates a configuration of the second flameout determination unit 32, i.e., for precisely determining a flameout upon starting-up the gas turbine apparatus 100. FIG. 8 is a graph showing changes in the rotational speed NR of the turbine, and the air/fuel ratio A/F upon start of the gas turbine apparatus.

As illustrated in FIG. 7, the second flameout determination unit 32 is composed of a corrected air/fuel ratio calculation unit 321, and a comparison/determination unit 322. In the corrected air/fuel ratio calculation unit 321, a rotation deviation calculation unit 321a calculates a deviation $\Delta NR$ of the rotational speed NR of the turbine 1 detected by the rotational speed sensor 12 from a predetermined reference rotational speed NR(ref), and a multiplier 321b multiplies the deviation $\Delta NR$ by a predetermined constant Z to calculate a correction value $\Delta NR \cdot Z$. Then, an adder 321c adds the corrected value $\Delta NR \cdot Z$ and the air/fuel ratio A/F calculated by the air/fuel ratio calculation unit 33 to derive a corrected air/fuel ratio A/Fc':

$$A/Fc' = A/F + \Delta NR \cdot Z$$

The corrected air/fuel ratio A/Fc' thus calculated is found as a substantially constant value. The reason for this fact will be explained with reference to FIG. 8. Upon starting-up the gas turbine apparatus 100, the rotational speed NR of the turbine 1 after the ignition (at time t2) increases at a substantially constant acceleration, as shown in FIG. 8, because of the increment of the amount of fuel. In other words, the rotational speed NR of the turbine 1 behaves substantially in proportion to the air/fuel ratio A/F. Therefore, by appropriately setting the reference rotational speed NR(ref), the deviation $\Delta NR$ of the rotational speed NR of the turbine 1 from the reference rotational speed NR(ref) presents a value which fluctuates substantially in proportion to the value of the air/fuel ratio A/F. It should be noted that a rated rotational speed during a non-load operation is preferably employed for the reference rotational speed NR(ref). Further, the constant Z can be found such that the correction value $\Delta NR \cdot Z$ obtained by multiplying the deviation and constant Z compensates the reduction of the air/fuel ratio A/F. Consequently, the corrected air/fuel ratio A/Fc' calculated by the corrected air/fuel ratio calculation unite 321 can be maintained substantially constant by adding the correction value ΔNR·Z to the air/fuel ratio A/F.

Next, the corrected air/fuel ratio A/Fc' calculated as described above is sent to the comparison/determination unit 322. The comparison/determination unit 322 determines, based on the corrected air/fuel ratio A/Fc' sent from the corrected air/fuel ratio calculation unit 321, whether or not a flameout occurs. Specifically, a predetermined reference air/fuel ratio A/F'(ref) has been set at the comparison/determination unit 322, such that the comparison/determination unit 322 generates a signal indicating that a flameout has occurred when the corrected air/fuel ratio A/Fc' falls below the reference air/fuel ratio A/F'(ref). As this signal is generated, the emergency shut-down valve 4 is operated to shut down the supply of fuel to the combustor 2.

As described above, the corrected air/fuel ratio A/Fc' calculated by the corrected air/fuel ratio calculation unit 321 is substantially constant even upon starting up the gas turbine apparatus 100. Therefore, the reference air/fuel ratio A/F'(ref) can be increased to and set at a value closer to the corrected air/fuel ratio A/Fc', as shown in FIG. 8, as compared with that (A/F(ref1)) which is set in the conventional flameout detecting method. As a result, when a flameout actually occurs, the corrected air/fuel ratio A/Fc' is immediately reduced to the reference air/fuel ratio A/F'(ref), thereby making it possible to extremely rapidly determine that the flameout has occurred. In this way, any accident possibly caused by the occurrence of the flameout can be obviated.

In the first and second flameout determination units 31 and 32, when A/F(ref) can be set equal to A/F'(ref) through a test using an actual apparatus, the comparison/determination units 312, 322 may be integrated into one which can be used in common.

Figure 9:
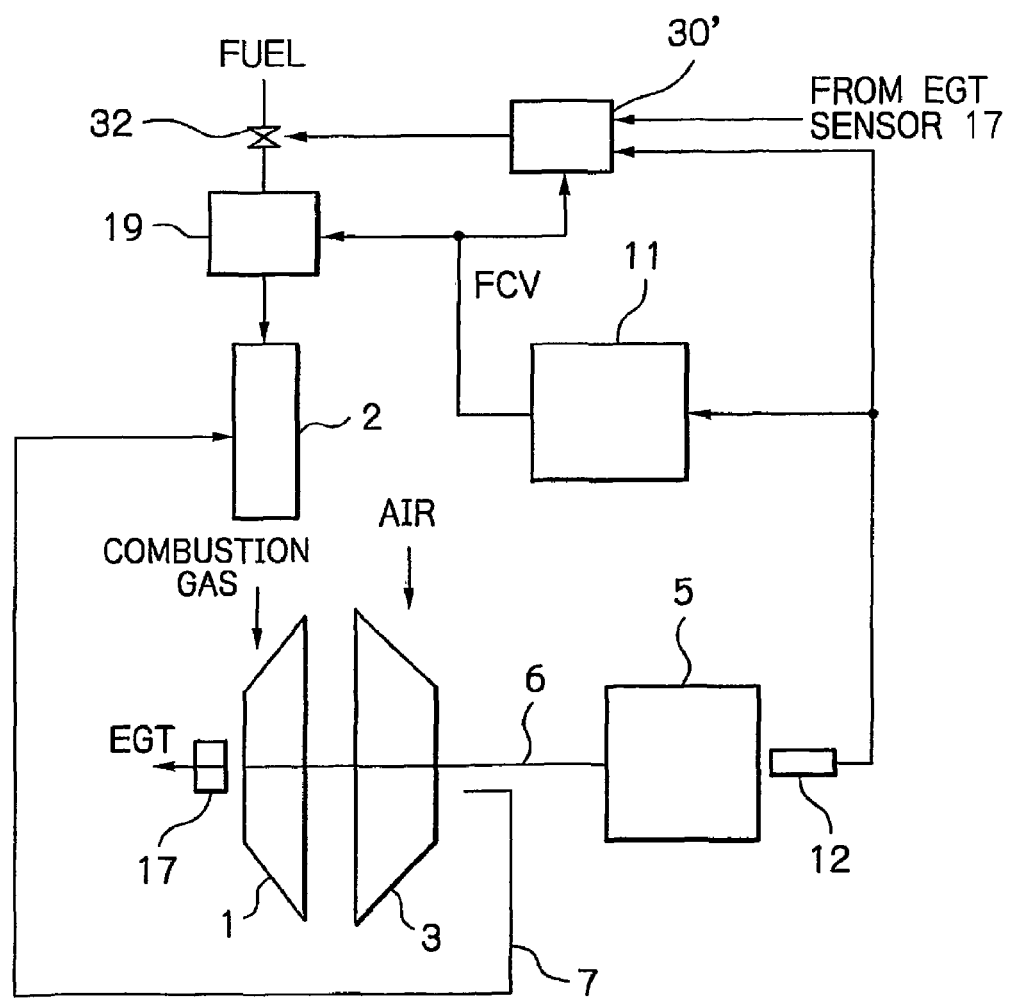
FIG. 9 is a block diagram illustrating a configuration of a gas turbine apparatus in another embodiment according to the present invention.
Figure 10:
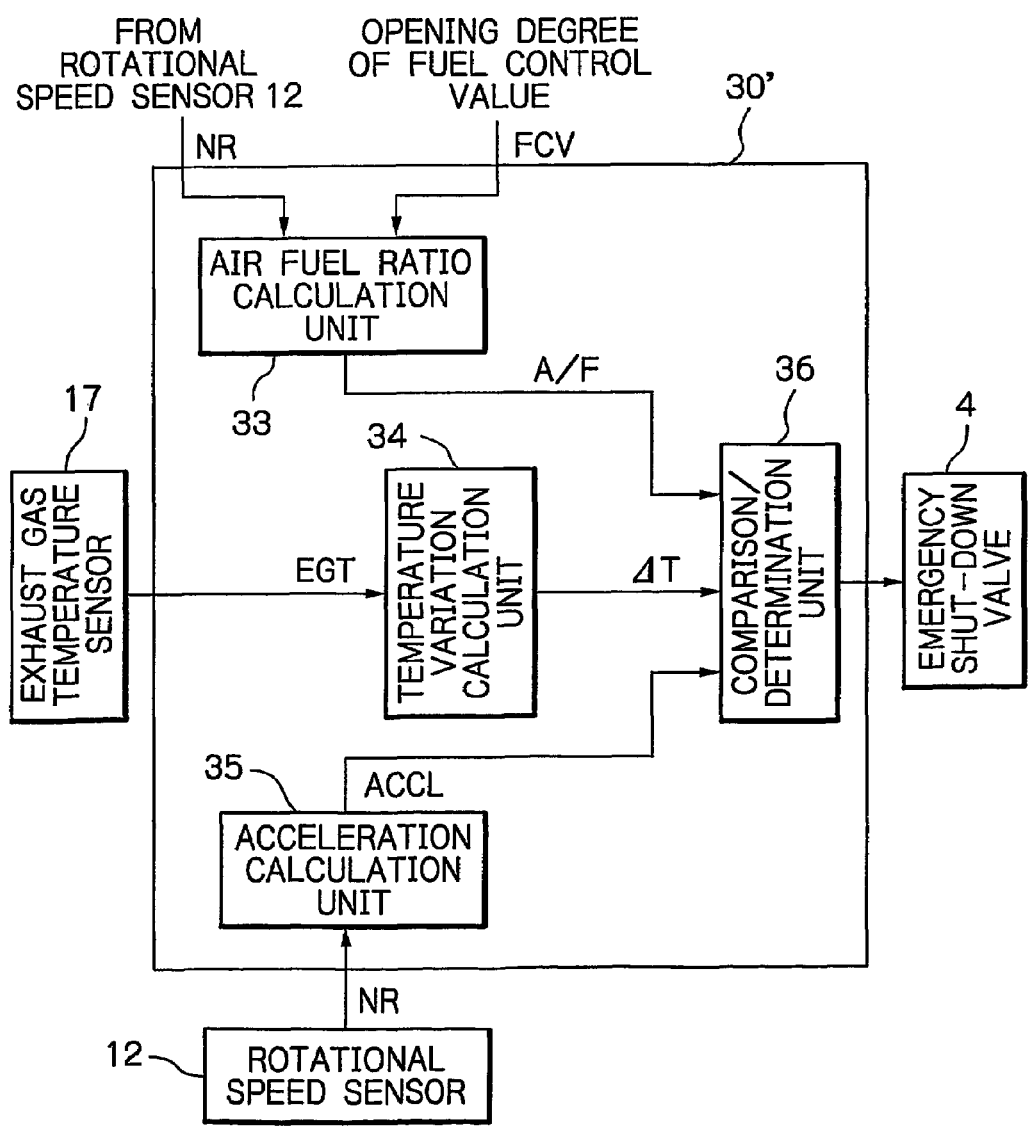
FIG. 10 is a block diagram illustrating an embodiment of a flameout determination section in the gas turbine apparatus illustrated in FIG. 9.

FIG. 9 illustrates a gas turbine apparatus 100' which comprises a flameout determination unit 30' in another embodiment according to the present invention. The flameout determination unit 30' determines whether or not a flameout occurs during a normal operation of the gas turbine apparatus. The gas turbine apparatus 100' comprises a temperature sensor 17 which is installed in a pipe on the gas exhaust side of the turbine 1 for detecting a temperature of exhaust gases (mainly, a combustion gas). A signal EGT indicative of the exhaust gas temperature detected by the sensor 17 is communicated to the flameout detection unit 30' together with a signal NR indicative of the rotational speed from a rotational speed sensor 12, and a signal FCV indicative of the opening degree of the fuel control valve 19 from a turbine controller 11. As illustrated in FIG. 10, the flameout determination unit 30' comprises an air/fuel ratio calculation unit 33 for calculating an air/fuel ratio of air to fuel in the mixture, a temperature variation calculation unit 34 for calculating a variation of the exhaust gas temperature EGT from the temperature sensor 17; an acceleration calculation unit 35 for calculating an acceleration speed ACCEL of the turbine 1 based on the rotational speed NR detected by the rotational speed sensor 12; and a comparison/determination unit 36 for determining occurrence of a flameout.

As mentioned above, the air/fuel ratio calculation unit 33 calculates the air/fuel ratio based on the rotational speed of the turbine 1 from the rotational speed sensor 12, and the opening degree of the fuel control valve 19 from the turbine control unit 11.

The temperature variation calculation unit 34 samples the temperature EGT measured by the exhaust temperature sensor 17 at predetermined intervals, and compares each sampling value with the preceding sampling value to calculate the variation ΔEGT of the exhaust gas temperature.

The comparison/determination unit 36 is communicated with the values calculated by the air/fuel ratio calculation unit 33, temperature variation calculation unit 34 and acceleration calculation unit 35, respectively. Then, the comparison/determination unit 36 determines whether or not a flameout has occurred based on these calculated values. Specifically, the comparison/determination unit 36 outputs a signal indicating that a flameout has occurred only in such a case that the air/fuel ratio A/F calculated by the air/fuel ratio calculating unit 33 is below a predetermined reference air/fuel ratio A/F(ref), the temperature variation ΔEGT for the exhaust gas temperature calculated by the temperature variation calculation unit 34 is negative, and the rotational speed acceleration ACCEL of the turbine 1 calculated by the acceleration calculation unit 35 is negative. Then, the emergency shut-down valve 4 is operated to immediately shut down the supply of fuel to the combustor 2.

Figure 11:
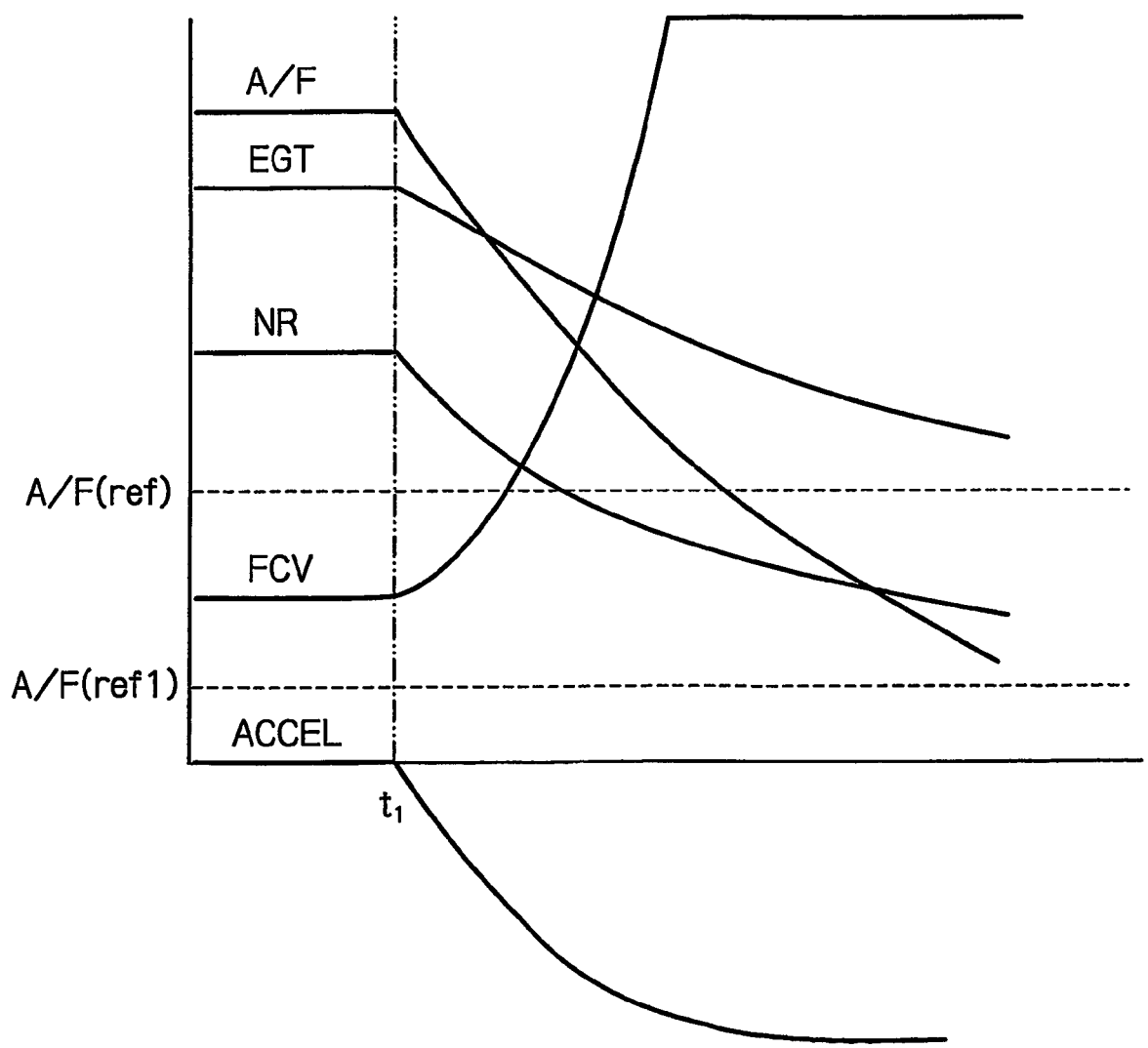
FIG. 11 is a graph for explaining how the employment of the flameout determination section illustrated in FIG. 10 can prevent erroneous detection for flameout during a normal operation and can promptly detect a flameout when it actually occurs.

The reason that the air/fuel ratio A/F, exhaust gas temperature EGT and the acceleration ACCEL of the turbine 1 can be employed as factors for determining occurrence of a flameout, will be explained with reference to FIG. 11. FIG. 11 is a graph showing fluctuations over time of the air/fuel ratio A/F, exhaust gas temperature EGT, rotation speed NR, and acceleration ACCEL, and the opening degree FCV of the fuel control valve, when a flameout occurs in the gas turbine apparatus 100'. As the flameout occurs at time t1, combustion flame extinguishes so that the turbine 1 is not supplied with the combustion gas, resulting in a decrease in the rotational speed NR of the turbine 1, as shown in FIG. 11. In response thereto, the opening degree FCV of the fuel control valve is increased by a feedback control for increasing the decreasing rotational speed NR, and as a result, the air/fuel ratio A/F changes in a decreasing direction. Also, since the combustion flame extinguishes, the temperature of the combustion gas, i.e., the exhaust gas temperature EGT also decreases. Since the rotational speed NR of the turbine 1 is decreased, the acceleration ACCEL of the turbine 1 turns into a negative value.

In this way, phenomena which appear when the flameout occurs, include a reduction in the air/fuel ratio A/F, a reduction in the exhaust gas temperature EGT, and a negative acceleration ACCEL of the turbine 1. It is therefore possible to precisely determine the occurrence of a flameout by monitoring these phenomena at all times or continuously, and determining that the flameout has occurred only when the air/fuel ratio A/F falls below the previously set predetermined reference air/fuel ratio A/F(ref), the variation of the exhaust gas temperature EGT turns into negative, and the rotation acceleration ACCEL of the turbine 1 turns into negative.

With the employment of the flameout determining method as described above, the exhaust gas temperature EGT does not decrease when the gas turbine apparatus 100' is subjected to an increasing load condition, thereby preventing incorrect determination that a flameout has occurred. Also, since the occurrence of a flameout is determined only when the aforementioned three criteria are satisfied, it is possible to prevent misidentification of a flameout when a load applied to the gas turbine apparatus 100' is increased to cause a reduction in the air/fuel ratio. Further, in a case that only the air/fuel ratio is simply employed as a factor for determining the occurrence of a flameout as in a prior art, the reference air/fuel ratio must be set relatively low as indicated by A/F(ref1) in FIG. 11. In contrast, the flameout determining method of the present invention can set the reference air/fuel ratio A/F(ref) higher than that in the prior art. As a result, when a flameout actually occurs, the reduced air/fuel ratio A/F promptly reaches the reference air/fuel ratio A/F(ref), permitting a rapid determination of the occurrence of the flameout. It is therefore possible to stop supplying the fuel immediately after the flameout actually occurs, thereby obviating an accident.

The second flameout determination unit 32 illustrated in FIG. 7 may be incorporated into the flameout determination unit 30' described with reference to FIGS. 9 to 11. In this way, misidentification of a flameout can be prevented not only during a normal operation of the gas turbine apparatus 100' but also upon starting. It should be understood that the gas turbine apparatus according to the present invention is not limited to the foregoing embodiments, but a variety of modifications can be made without departing from the spirit and scope of the present invention.

What is claimed is:

1. A gas turbine apparatus for burning a mixture of a fuel and compressed air, and supplying a turbine with a combustion gas generated by the combustion to drive the turbine, wherein the gas turbine apparatus includes a flameout determination unit comprising:
   means for calculating an air/fuel ratio in the air/fuel mixture;
   means for correcting the calculated air/fuel ratio to calculate a corrected air/fuel ratio which is substantially constant during an absence of a flameout; and
   determination means for comparing the calculated corrected air/fuel ratio with a predetermined reference air/fuel ratio to generate a signal indicative of occurrence of a flameout when the corrected air/fuel ratio is smaller than the reference air/fuel ratio.

2. A gas turbine apparatus according to claim 1, wherein the corrected air/fuel ratio calculation means comprises:
   means for calculating a pressure deviation of compressed air from an air compressor detected by pressure detection means from a predetermined reference pressure, and multiplying the pressure deviation by a predetermined constant; and
   means for adding the value obtained by multiplying the pressure deviation and the predetermined constant to the air/fuel ratio calculated by the air/fuel ratio calculation means to calculate a corrected air/fuel ratio which remains substantially constant even when the gas turbine apparatus is applied with an increasing load.

3. A gas turbine apparatus according to claim 1, wherein the corrected air/fuel ratio calculation means comprises:
   means for calculating a rotation deviation of a rotational speed of the turbine detected by rotational speed detection means from a predetermined reference rotational speed, and multiplying the rotational speed deviation by a predetermined constant; and
   means for adding the value obtained by multiplying the rotational speed deviation and the predetermined constant to the air/fuel ratio calculated by the air/fuel ratio calculation means to calculate a corrected air/fuel ratio which remains substantially constant during a starting-up condition of the gas turbine apparatus is started.

4. A gas turbine apparatus according to claim 1, wherein the corrected air/fuel ratio calculation means comprises first and second corrected air/fuel ratio calculation means, and wherein
   the first corrected air/fuel ratio calculation means comprises:
      means for calculating a pressure deviation of compressed air from an air compressor detected by pressure detection means from a predetermined reference pressure, and multiplying the pressure deviation by a predetermined constant; and
      means for adding the value obtained by multiplying the pressure deviation and the predetermined constant to the air/fuel ratio calculated by the air/fuel ratio calculation means to calculate a first corrected air/fuel ratio which remains substantially constant even when the gas turbine apparatus is applied with an increasing load, and
   the second corrected air/fuel ratio calculation means comprises:
      means for calculating a deviation of the rotational speed of the turbine detected by rotational speed detection means from a predetermined reference rotational speed, and multiplying the rotational speed deviation by a predetermined constant; and
      means for adding the value obtained by multiplying the rotational speed deviation and the predetermined constant to the air/fuel ratio calculated by the air/fuel ratio calculation means to calculate a second corrected air/fuel ratio which remains substantially constant during a starting-up condition of the gas turbine apparatus is started.

5. A gas turbine apparatus according to claim 4, wherein the determination means comprises a first and second determination means, wherein:
   the first determination means is adapted to compare the first corrected air/fuel ratio with a first predetermined reference air/fuel ratio to generate a signal indicative of occurrence of a flameout when the first corrected air/fuel ratio is smaller than the first reference air/fuel ratio; and
   the second determination means is adapted to compare the second corrected air/fuel ratio with a second predetermined reference air/fuel ratio to generate a signal indicative of occurrence of a flameout when the second corrected air/fuel ratio is smaller than the second reference air/fuel ratio.

6. A gas turbine apparatus according to claim 1, wherein the correcting means is adapted to calculate the corrected air/fuel ratio on the basis of an exhaust gas temperature or a rotational speed of the turbine.

7. A gas turbine apparatus for burning a mixture of a fuel and air compressed by an air compressor, and supplying a turbine with a combustion gas generated by the combustion to drive the turbine, wherein the gas turbine apparatus includes a flameout determination unit comprising:
   means for calculating an air/fuel ratio in the air/fuel mixture;
   means for calculating an acceleration of a rotational speed of the turbine detected by rotational speed detection means;
   means for calculating a variation of an exhaust gas temperature of the turbine detected by temperature detection means; and
   determination means for determining whether the calculated air/fuel ratio is smaller than a predetermined reference air/fuel ratio, determining whether the calculated acceleration of the rotational speed of the turbine is negative, and determining whether the calculated variation of the exhaust gas temperature is negative, to generate a signal indicative of occurrence of a flameout when the results of the determinations are all affirmative.

* * * * *